Jan. 5, 1965   R. R. STAFFORD   3,164,360
FLUID CONDUIT AND BRANCH OUTLET CONSTRUCTION
Filed Dec. 26, 1962   2 Sheets-Sheet 1

INVENTOR.
ROBERT R. STAFFORD
BY
BUCKHORN, CHEATHAM & BLORE
ATTORNEYS

Jan. 5, 1965  R. R. STAFFORD  3,164,360
FLUID CONDUIT AND BRANCH OUTLET CONSTRUCTION
Filed Dec. 26, 1962  2 Sheets-Sheet 2

INVENTOR.
ROBERT R. STAFFORD
BY
BUCKHORN, CHEATHAM & BLORE
ATTORNEYS

United States Patent Office 3,164,360
Patented Jan. 5, 1965

3,164,360
FLUID CONDUIT AND BRANCH OUTLET
CONSTRUCTION
Robert R. Stafford, Rte. 4, Box 177D, Eugene, Oreg.
Filed Dec. 26, 1962, Ser. No. 247,130
9 Claims. (Cl. 251—146)

My present invention comprises an improvement in fluid conduits, the invention being particularly concerned with the field irrigation conduits comprising a main conduit with branch outlets. The invention is of utility in any situation where it is desired that a branch be removably connected to a main conduit, particularly at points remote from the ends of any pipe sections comprising the main conduit. The invention is also of utility in any such situation where a main conduit is to be provided with a branch after the complete main conduit has been assembled and laid down.

The principal utility for the present invention is in connection with field irrigation systems wherein a permanently assembled main conduit is provided, and a branch is removably attached thereto at various points along its length. For example, a main conduit may extend along a large field and a single, movable, releasably coupled branch may be connected thereto at one point, utilized to irrigate a section of the field, then moved and connected to the main conduit at a succeeding point for irrigating a succeeding section of the field, and so on. A principal purpose of the present invention is to provide means whereby the necessity for permanently connected stub outlets with valves and valve operators is eliminated. With the present invention a single stub outlet and valve operator may be successively moved along the main conduit so as to operate individually a series of valves mounted on the main conduit.

A further object of the present invention is to provide a construction of the foregoing character which is easily made of easily formed parts.

A further object of the present invention is to provide a branch outlet construction including a valve which may be opened and closed against internal fluid pressure of the main conduit without chattering and without creating water hammer. Water hammer in situations of this sort can be destructive of the main conduit.

The objects and advantages of the present invention will be more readily apparent from inspection of the accompanying drawings taken in connection with the following specification, wherein like numerals refer to like parts throughout.

Figure 1:
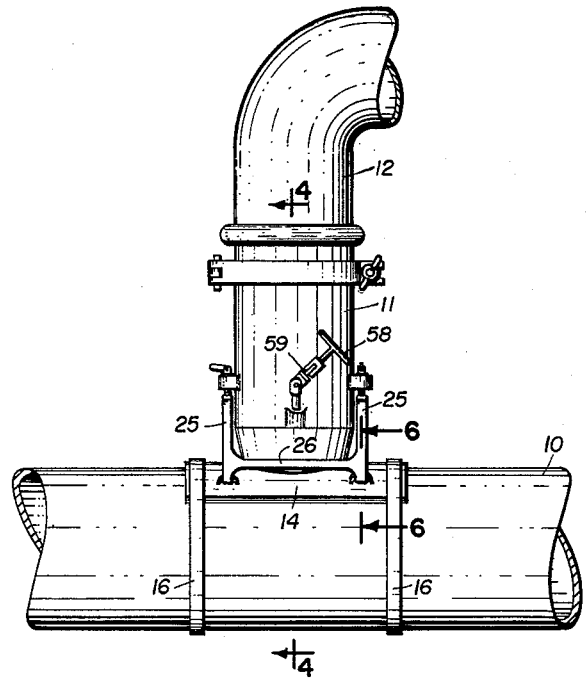
FIG. 1 is a side elevation of a section of a main conduit having a section of a branch conduit associated therewith in accordance with the present invention.

In the drawings, the main conduit is referred to by the numeral 10, which main conduit may be a long length of pipe sections welded end to end, or separably coupled together end to end. It is to be appreciated that a branch conduit 11 is to be associated with the main conduit at any of a plurality of points along the length thereof at which means have been provided for associating the branch conduit with the main conduit. The branch conduit may be merely a stub, or may have an elbow 12 connected thereto such as by suitable swivel and clamp means, the details of which are not illustrated.

Figures 4, 5, 6, 7:
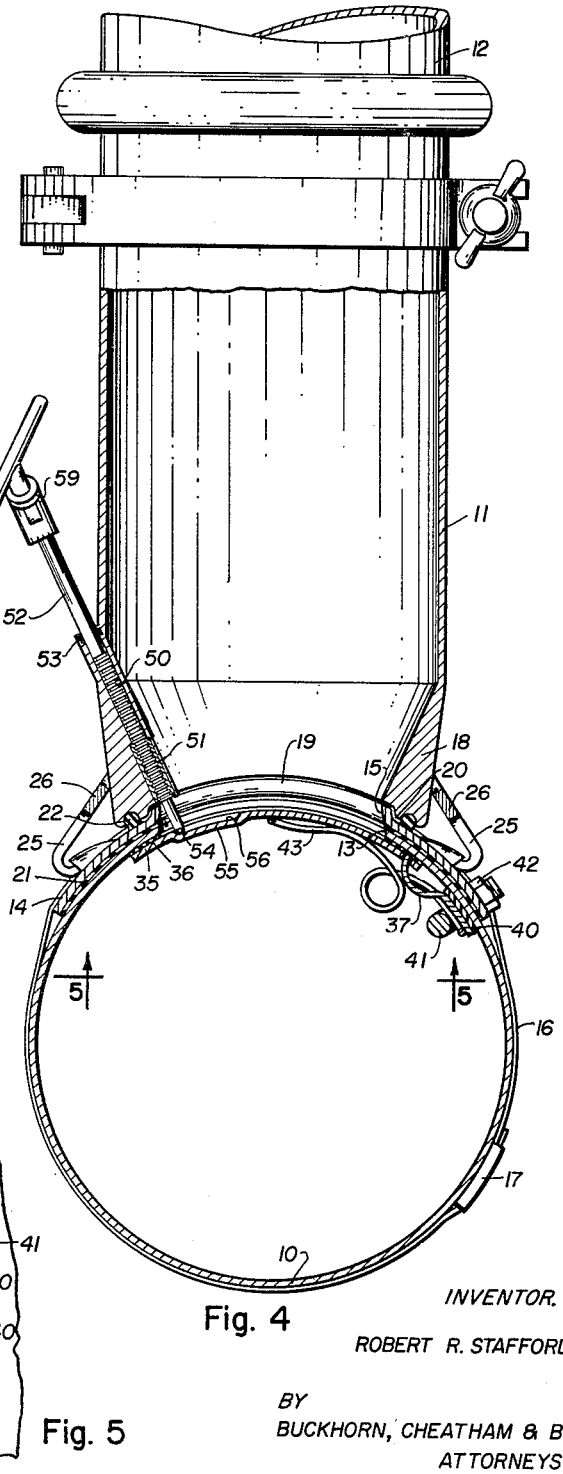
FIG. 4 is an enlarged vertical section taken along the line 4—4 of FIG. 1 substantially through the axis of the branch conduit, the view being on an enlarged scale.
FIG. 5 is a view looking upward from the plane of line 5—5 of FIG. 4.
FIG. 6 is a partial vertical section view showing a detail, on an enlarged scale, taken substantially along line 6—6 of FIG. 1.
FIG. 7 is an enlarged vertical section of the inner end of the valve stem.

In accordance with the present invention the main conduit is provided with a plurality of outlet openings 13 as shown in FIGS. 4 and 5, the openings being axially elongated and being of such size that a hand may be inserted therethrough. A saddle plate 14, shaped to fit the exterior of the conduit, is clamped to the outer surface of the main conduit, and is provided with an opening 15 of substantially the same outline as the opening 13, the saddle plate 14 being arranged so that the two openings register with each other. The saddle plate is conveniently clamped in position by means of a pair of steel straps 16 encircling the ends of the plate and the conduit and held in position by metal crimping devices 17. The branch conduit 11 is preferably molded and comprises an oval shaped, thickened, lower portion 18, the end of which is shaped to conform with the outer surface of the saddle plate 14 with the interior thereof forming a prolongation of the opening 15. The saddle plate 14 is provided with an outwardly extending continuous flange 19 surrounding the opening 15, and the end of the conduit 11 comprises a continuous flange 20 which embraces the flange 19, the outer portion of the end of the branch conduit thereby surrounding the flange 19 so as to prevent slippage of the branch conduit laterally with respect to the main conduit.

A first gasket 21 is imposed between the adjoining surfaces of the saddle plate and the main conduit, and a second gasket 22 is received in a circumferential groove in the end surface of the branch conduit so as to provide a seal between the branch conduit and the saddle plate.

Figure 2:
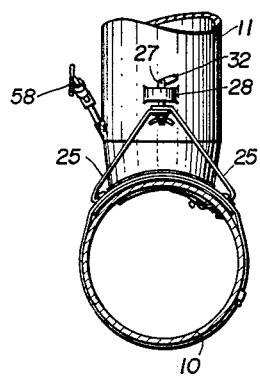
FIG. 2 is an end view of FIG. 1.
Figure 3:
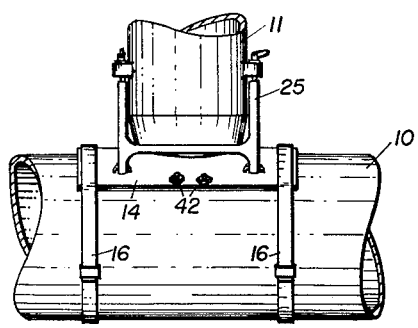
FIG. 3 is a side elevation taken from the opposite side from the elevation of FIG. 1.

The branch conduit is held in position by a plurality of claw members 25, there being a pair of such members 25 connected by a crossbrace 26 at each side of the branch conduit. The upper end of each of the claw members 25 is perforated to pivotally receive the stem of a tightening screw 27 which is threadedly engaged in a boss 28 on the branch conduit 11, as shown in FIG. 2, and the lower end of each claw member 25 is provided with a claw 30 which is engaged in a receiving socket 31 formed by striking a portion of the saddle plate outwardly as shown in FIG. 6. The tightening screw 27 is provided with a pivotally mounted handle 32 whereby the tightening screw may be turned in order to draw the claw members 25 taut to clamp the gasket 22 against the saddle plate and to hold the branch conduit in position.

A valve plate 35, shaped to fit the inner surface of conduit 10, is pivotally mounted within the main conduit 10, the valve plate having the general outline of the opening 13 but being considerably larger so that a peripheral portion of the valve plate may be positioned in overlapping relation with the inner surface of the conduit 10 entirely around the opening 13 as shown in FIG. 5. A third gasket 36 is fixed to the surface of the valve plate, so as to seal the valve opening when the valve plate is closed, as illustrated in FIG. 4. The valve plate is hingedly mounted within the conduit for swinging movement about a line extending generally along one edge of the valve plate in a direction axially of the conduit 10. The hinge means comprises a hinge plate 37 having an arcuate end extending through a slot 38 in the valve plate 35 and bearing against the inner surface of the conduit 10. The hinge plate is clamped against a gasket strip 40, bearing against the inner surface of the conduit 10, by means of a U-bolt 41, the threaded ends of which project through the wall of the conduit and are engaged by nuts 42. A hairpin type spring 43 of considerable width is retained against the hinge member 37 by the bight of the U-bolt 41, the spring bearing against the central portion of the valve plate 35 and biasing the same toward the closed position.

One wall of the branch conduit 11 is provided with a valve stem receiving bore 50, into the lower end of which is molded a threaded bushing 51 for receiving the threaded portion of a valve stem 52. A gasket 53 is provided to seal the valve stem against leakage. The valve stem 52 has its axis lying in a plane extending at right angles to the axis of the main conduit 10, and is disposed at an acute angle with respect to the axis of the branch conduit 11. The lower end of the valve stem 52 clears the edges of the openings 15 and 13 and is provided with a thrust ball 54, as shown in FIG. 7 which bears against the outer surface of the valve plate 35 adjacent the edge thereof opposite the hinged edge thereof. A portion of the valve plate is depressed, as indicated at 55, so as to provide a transversely extending groove 56 in which the ball 54 is engaged. The upper end of the valve stem 52 is provided with rotating means, such as T-handle 58 connected to the valve stem through a universal joint 59.

The arrangement of the valve stem with respect to the valve plate is such that the maximum thrust possible may be exerted against the valve plate to cause it to swing about its hinged edge. As distinguished from valves of the prior art in which a valve cap moves axially with respect to the branch conduit, such a construction permits opening of the valve against the force of the spring 43 and fluid pressure internally of the conduit 10 without chatter, since a fine crack is first provided which relieves the pressure, and thereafter the main force required is to overcome the force of the spring 43. Similarly, the valve plate may swing closed without creating water hammer since the closing movement is gradually accomplished until a fine crack adjacent the inner end of the valve stem finally closes.

The opening 13 is of such a size that the valve plate 35 may be turned sideways and inserted through the opening, then the hinge member 37 and the U-bolt 41 may be loosely assembled within the conduit 10 until the valve plate may be hung by its slot 38 on the curved inner end of the hinge member 37. With the valve plate still loosely dangling within the conduit 10 the spring 43 may be slipped into position, being provided for this purpose with end portions 60 shaped to be embraced beneath the bight of the U-bolt. Thereafter the hand may be withdrawn and the nuts 42 tightened. When all the openings provided along the conduit are thus sealed by assembled saddle plates 14 and valve plates 35, the main conduit 10 may be connected to a source of fluid under pressure, such as an irrigation pump. Thereafter at any time a single branch conduit 11 may be moved successively to each of the valve assemblies, clamped to the main conduit, and the valve opened through operation of the valve stem 52.

The valve openings may be provided at any point along a pipe section, or along a welded pipe line, since the valves may be assembled entirely through the valve openings, and the valve openings may be cut into an assembled conduit.

Having illustrated and described a preferred embodiment of the invention, it should be apparent to those skilled in the art that the invention permits of modification in arrangement and detail. I claim as my invention all such modifications as come within the true spirit and scope of the following claims.

I claim:

1. A fluid conduit and branch outlet construction comprising a main cylindrical conduit having an outlet opening therein,
   a saddle plate shaped to lie against the outer surface of said main conduit and having an opening therethrough,
   means clamping said saddle plate onto the outer surface of said main conduit with said openings registering with each other,
   a branch conduit having an end shaped to fit against said saddle plate in surrounding relation to the opening therethrough when said branch conduit is in radially extending relation with respect to said main conduit,
   means releasably clamping said branch conduit to said main conduit in such radial relation to form a passageway between said main conduit and said branch conduit,
   a valve plate shaped to conform to the surface of said main conduit, pivotally mounted on said main conduit adjacent the opening therethrough, and having a peripheral portion thereof overlapping at least one of said openings to close said passageway,
   a plurality of gasket members respectively disposed in fluid sealing relation between the adjacent portions of said branch conduit and said saddle plate, and of said saddle plate and said main conduit,
   spring means mounted on said main conduit and biased against said valve plate to urge it outwardly toward the wall of said main conduit toward a closed position,
   a valve stem threadedly mounted in said branch conduit and extending radially of said main conduit, the axis of said stem lying in a plane at right angles to the axis of said main conduit and being disposed at an acute angle with respect to the axis of said branch conduit,
   the inner end of said valve stem being projectable through said openings to bear against the outer surface of said valve plate adjacent the edge thereof opposite the hinged edge thereof,
   and means for rotating said valve stem whereby said valve plate may be swung inwardly against the force of said spring means and the fluid pressure within said main conduit.

2. The construction set forth in claim 1 wherein said means releasably clamping said branch conduit to said main conduit comprises a plurality of claw members mounted on said branch conduit,
   a plurality of socket means on said saddle plate adapted to receive said claw members,
   and threaded tightening means hingedly connecting said claw members to said branch conduit.

3. The construction set forth in claim 1 wherein said valve stem comprises a thrust ball rotatably retained upon the inner end of said valve stem,
   and said valve plate is provided with a groove extending circumferentially with respect to the axis of said main conduit and in which said thrust ball is seated.

4. The construction set forth in claim 1 wherein said saddle plate is provided with a first continuous flange extending outwardly around the periphery of the opening therethrough,
   and said end of the branch conduit comprises a second continuous, axially projecting flange adapted to surround and bear against said first flange to prevent lateral displacement of said inner end with respect to said main conduit.

5. The construction set forth in claim 1 wherein the opening through said main conduit is elongated axially of the conduit,
   said valve plate is also elongated axially of said main conduit,
   the minor dimension of said valve plate being less than the major dimension of the opening in said main conduit whereby said valve plate may be inserted through said opening,
   the opening being of such dimensions as to permit the insertion of a hand for assembling the valve plate, hinge means and spring means with the conduit.

6. Fluid conduit apparatus, comprising:
a main conduit having an outlet opening through the side thereof;
a branch conduit having an end shaped to conform to said outlet opening;
fastening means for releasably attaching said end of said branch conduit to said main conduit so that the interior of said branch conduit can be placed in fluid communication with the interior of said main conduit through said outlet opening;
a valve plate movably mounted on said main conduit adjacent said outlet opening;
bias means for resiliently urging said valve plate toward a normally closed position to prevent the flow of fluid from said main conduit into said branch conduit through said outlet opening; and
control means for gradually pivoting said valve plate in a progressive manner against the force of said bias means and the force of the fluid pressure in said main conduit to move one side of said valve plate toward an open position while maintaining another side of said plate in a closed position to allow the flow of said fluid from said main conduit into said branch conduit and providing for gradual movement of said one side of said valve plate from an open position toward said closed position in a controlled manner.

7. Fluid conduit apparatus, comprising:
a main conduit having an outlet opening through the side thereof;
a branch conduit having an end shaped to conform to said outlet opening;
fastening means for releasably attaching said end of said branch conduit to said main conduit so that the interior of said branch conduit can be placed in fluid communication with the interior of said main conduit through said outlet opening,
a valve plate pivotally mounted on said main conduit adjacent said outlet opening;
spring means for resiliently urging said valve plate toward a normally closed position to prevent the flow of fluid from said main conduit into branch conduit through said outlet opening; and
control means mounted on said branch conduit including a valve stem threaded through one side of said branch conduit for gradually pivoting said valve plate in a progressive manner about one side of said valve plate against the force of said bias means and the force of the fluid pressure in said main conduit to move another side of said valve plate toward an open position to allow the flow of said fluid from said main conduit into said branch conduit, and for gradually pivoting said valve plate about said one side to move said another side of said valve plate from an open position toward said closed position in a controlled manner.

8. Fluid conduit apparatus, comprising:
a main conduit having a plurality of similar outlet openings through the side thereof which are spaced longitudinally along said main conduit;
a branch conduit having an end shaped to fit around each one of said outlet openings;
fastening means for releasably attaching said end of said branch conduit to said main conduit in registration with one of said outlet openings;
a plurality of valve plates pivotally mounted on said main conduit with one of said valve plates positioned adjacent each of said outlet openings;
a plurality of springs attached to said main conduit for resiliently urging each of said valve plates toward a normally closed position covering said outlet openings; and
a control means mounted on said branch conduit for pivoting the one valve plate covering said one outlet opening connected to said branch conduit against the force of one of said springs and the fluid pressure in said main conduit to move one side of said one valve plate toward an open position, and for progressively pivoting said one valve plate from an open position toward a closed position, so that said branch conduit can be moved and connected at different positions along said main conduit in order to provide a plurality of valve controlled outlets.

9. Fluid conduit apparatus, comprising:
a main conduit having an outlet opening through the side thereof;
a branch conduit having an end shaped to fit around said outlet opening;
a saddle plate secured to the outer surface of said main conduit so that an aperture through said saddle plate registers with said outlet opening, said saddle plate having a plurality of raised socket portions;
a plurality of claw members attached to said branch conduit on opposite sides thereof and having their hook ends inserted into said socket portions of said saddle plate;
means for tightening said claw members in order to clamp said branch conduit to said main conduit;
a valve plate movably mounted on said main conduit adjacent said outlet opening;
bias means for resiliently urging said valve plate toward a normally closed position to prevent the flow of fluid from said main conduit into said branch conduit through said outlet opening; and
control means for gradually pivoting said valve plate in a progressive manner against the force of said bias means and the force of the fluid pressure in said main conduit to move one side of said valve plate toward an open position while maintaining another side of said plate in a closed position to allow the flow of said fluid from said main conduit into said branch conduit and providing for gradual movement of said one side of said valve plate from an open position toward said closed position in a controlled manner.

References Cited in the file of this patent
UNITED STATES PATENTS

| | | |
|---|---|---|
| 972,384 | Kellar | Oct. 11, 1910 |
| 1,368,970 | Roberts | Feb. 15, 1921 |
| 1,439,763 | Shaffer | Dec. 26, 1922 |
| 2,503,031 | Davidson | Apr. 4, 1950 |
| 2,923,308 | Shohan | Feb. 2, 1960 |

FOREIGN PATENTS

| | | |
|---|---|---|
| 967,914 | France | Apr. 5, 1950 |